United States Patent [19]

Gaston

[11] Patent Number: 4,494,007
[45] Date of Patent: Jan. 15, 1985

[54] WIND MACHINE

[75] Inventor: Everett E. Gaston, Monroe, Nebr.

[73] Assignee: Gaston Manufacturing, Inc., Monroe, Nebr.

[21] Appl. No.: 414,385

[22] Filed: Sep. 2, 1982

[51] Int. Cl.$^3$ .......................... F03D 7/00; F03D 7/06; F03D 3/00; H02P 9/04

[52] U.S. Cl. ..................... 290/44; 290/55; 416/17; 416/41; 416/122; 73/188

[58] Field of Search ..................... 290/44, 55; 416/17, 416/122, 41; 73/188

[56] References Cited

U.S. PATENT DOCUMENTS

| | | | |
|---|---|---|---|
| 715,480 | 12/1902 | Hudspith | 416/17 |
| 4,286,922 | 9/1981 | Lew | 416/17 |
| 4,297,076 | 10/1981 | Donham et al. | 416/17 X |
| 4,365,934 | 12/1982 | Mason | 416/17 |
| 4,366,387 | 12/1982 | Carter, Jr. et al. | 290/55 |
| 4,382,191 | 5/1983 | Potter | 290/55 |
| 4,392,780 | 7/1983 | Taft | 416/17 |
| 4,402,220 | 9/1983 | Kuhlmann et al. | 73/188 |
| 4,406,584 | 9/1983 | Stepp | 416/41 |
| 4,410,806 | 10/1983 | Brulle | 290/44 |
| 4,441,858 | 4/1984 | Lew | 416/17 |

Primary Examiner—A. T. Grimley
Assistant Examiner—Terry Flower
Attorney, Agent, or Firm—Vincent L. Carney

[57] ABSTRACT

To generate power from wind economically, a feathering vane is pivotally mounted perpendicular to a tail vane and shifts the orientation of a sprocket assembly controlled by the tail vane in response to wind velocity. The sprocket assembly changes the orientation of blades which orbit about and rotate the main power shaft so that, as wind velocity changes, the blade orientations are shifted in a compensating direction under the control of the tail vane. A lever shifts the position of the blades to positions that balance wind power and brake the rotation for maintenance purposes. The speed-control mechanism includes a damper to avoid being excessively affected by wind gusts. The main shaft is connected through a speed increaser which has less mass at the high-speed end than the low-speed end to an induction generator when used for cogeneration, the field of the induction generator being excited by the cogeneration frequency.

5 Claims, 6 Drawing Figures

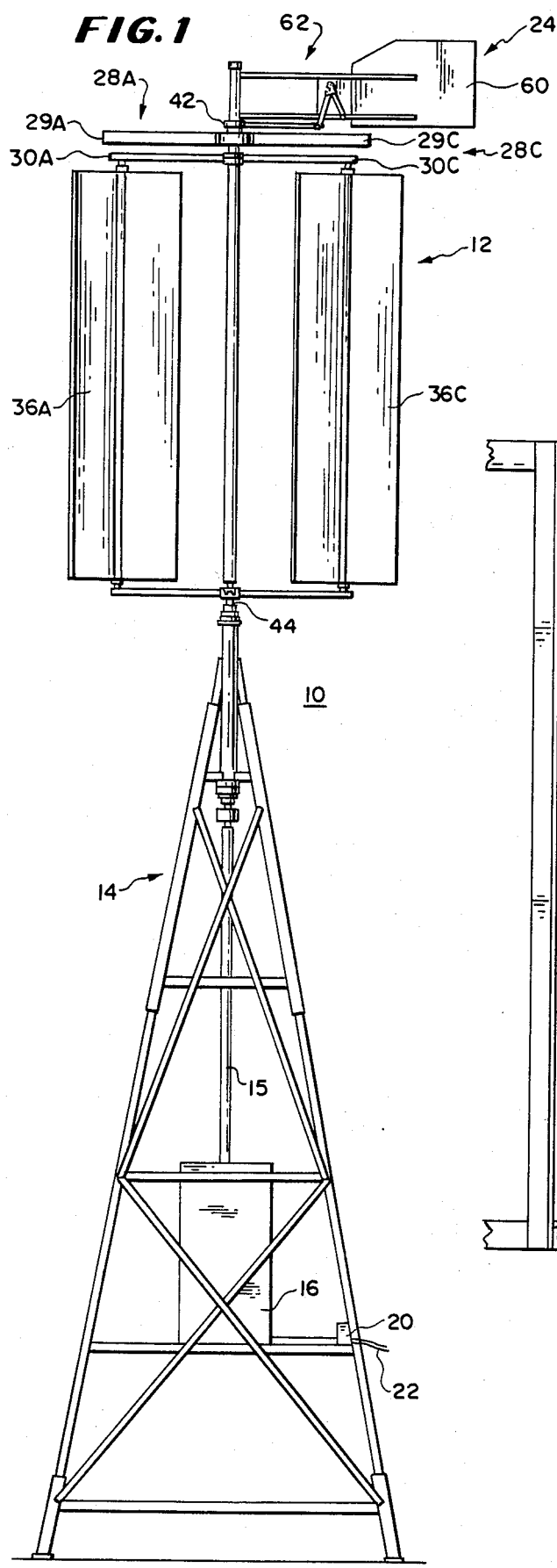
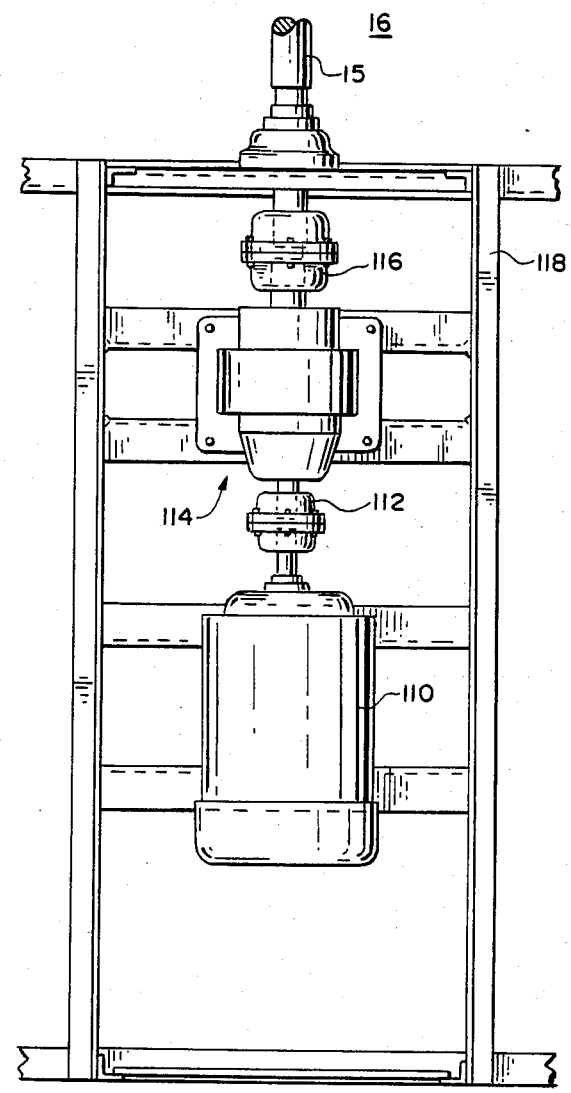

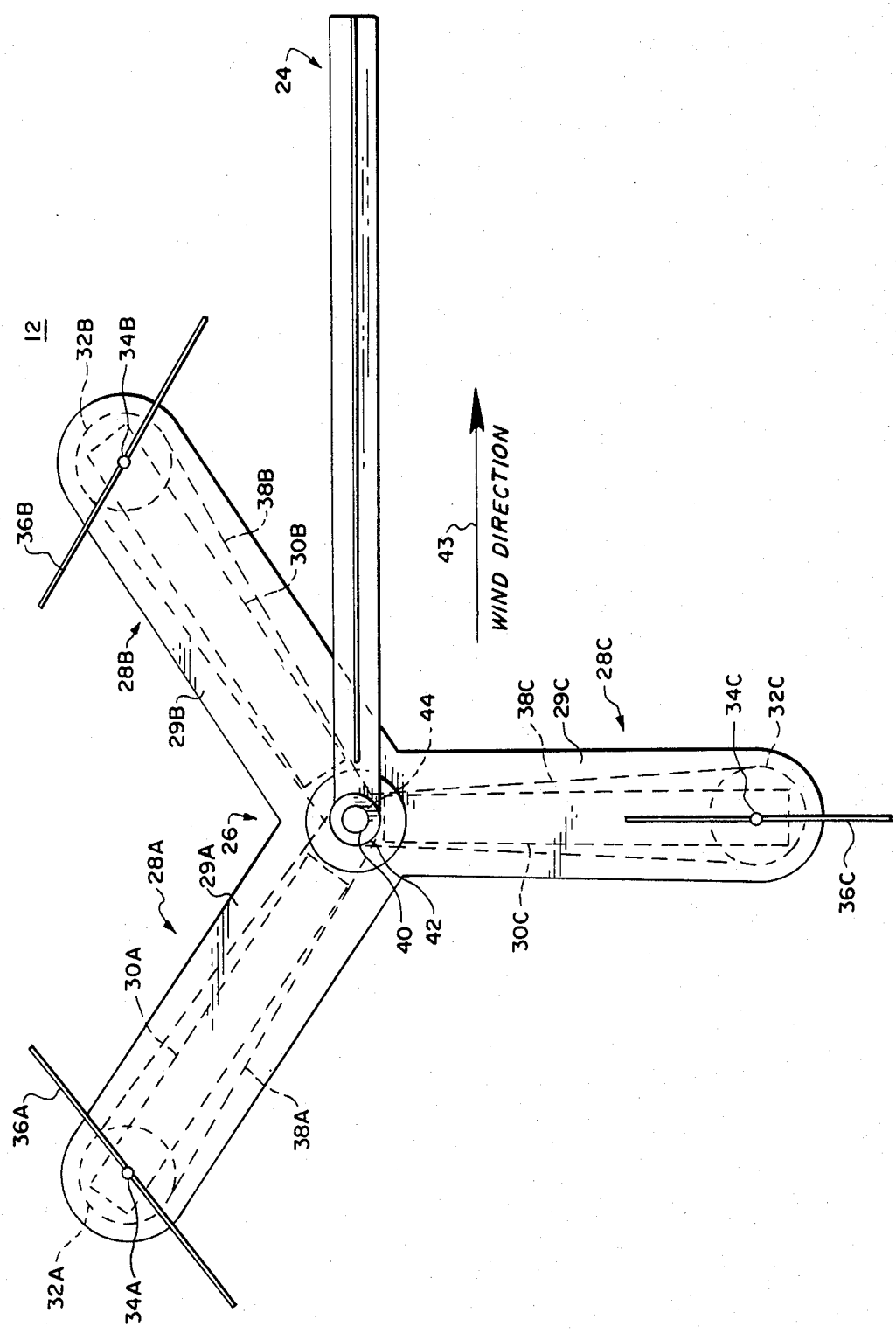

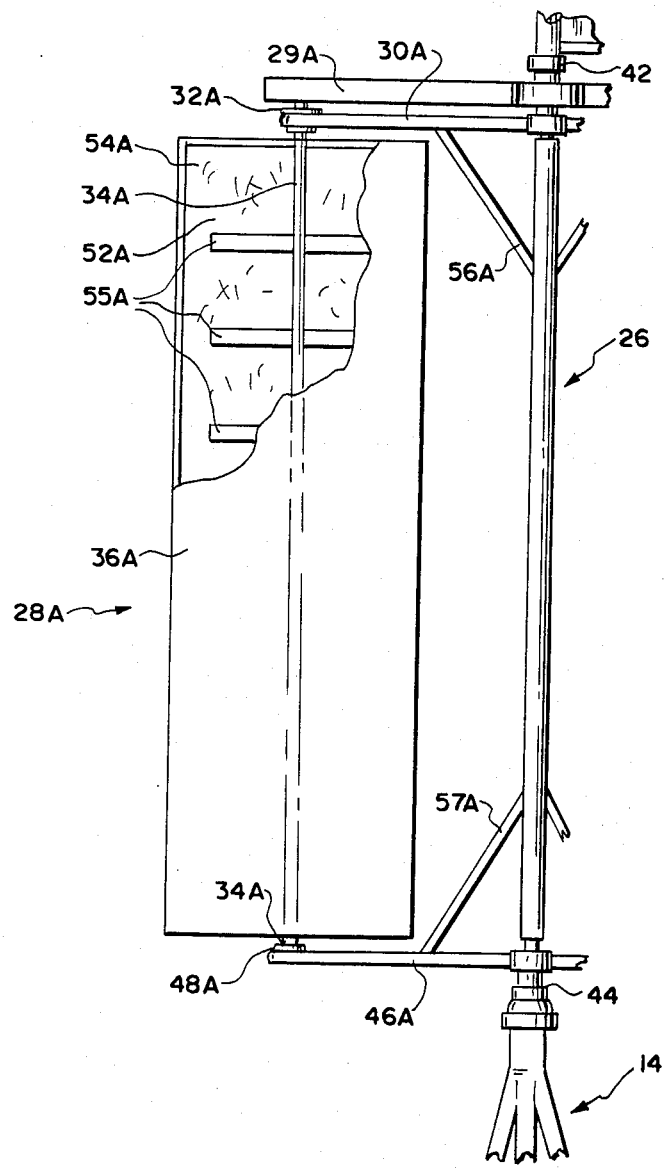

WIND MACHINE

BACKGROUND OF THE INVENTION

This invention relates to wind machines.

In one class of wind machine, each of a plurality of blades is independently mounted about its own axle for rotation about its axle and each are mounted to a central rotating shaft about which they orbit. A tail vane controls the orientation of the blades about their independent axles so that they are always at an angle which receives the benefit of the prevailing wind direction as they orbit about the central axis. The main shaft is rotated by the blades as they orbit and provides a mechanical output or drives an electrical generator for an electrical output.

In a prior art wind turbine of this class, the speed control of the windmill is centrifugally governed and the blades are relatively heavy. The main shaft, if it is used to drive an electrical generator, drives a DC generator or an AC generator through a transmission. A typical wind turbine of this class is disclosed in U.S. Pat. No. 715,480 granted Dec. 9, 1902 although others are known in the art.

The prior art wind turbines have several disadvantages, such as: (1) they are not sufficiently strong and durable; (2) they have a high capital cost for each kilowatt of power provided; (3) their speed control is load dependent rather than dependent upon wind velocity; (4) they are damaged or must be completely shut down at high velocities of wind; and (5) either asynchronous low-frequency AC potential is provided or DC potential or AC synchronous potential at a very low power because of inefficient coupling or the need of DC-to-AC conversion.

SUMMARY OF THE INVENTION

Accordingly, it is an object of the invention to provide a novel wind turbine.

It is a further object of the invention to provide a novel method of utilizing wind power to generate mechanical or electrical power.

It is a still further object of the invention to provide a novel method and apparatus for controlling the speed of a windmill.

It is a still further object of the invention to provide a novel method and apparatus for blocking rotation of a wind turbine such as for maintenance or the like.

It is a still further object of the invention to provide a windmill having high efficiency in power output.

It is a still further object of the invention to provide a speed control for a windmill which is controlled by wind velocity.

It is a still further object of the invention to provide a speed control for windmills which is not influenced by sudden gusts of wind.

It is a still further object of the invention to provide a superior coupling between a windmill and a synchronous generator which makes maximum use of proper wind power.

It is a still further object of the invention to provide a sturdy blade construction for windmills.

In accordance with the above and further objects of the invention, wind-driven blades orbit about a center point and are controlled in angular position about their axles of rotation in response to changes in wind direction and velocity. Advantageously, a feathering vane is pivotally mounted at an angle to the supporting shaft of a tail vane which aligns itself with the wind and, through a transmission assembly, controls the orientation of the wind-driven blades about their own axes.

The feathering vane is pivoted in proportion to the strength of the wind and, as it pivots, it shifts a sprocket assembly in the transmission to change the orientation of the orbiting blades which generate power from the wind. At high wind velocity the feathering reduces the speed of orbiting as the wind increases and increases the speed of orbiting as the wind decreases. A lever connected to this mechanism may be used to disorient the blades by ninety degrees and thus stop orbiting altogether for maintenance operations of the windmill. A hydraulic buffer prevents rapid shifting from gusts of wind.

The blades themselves are relatively strong, having a metallic outer shell for strength and lightness with a foam plastic interior, and they have an area which, compared to the area of the tail vane, is insufficient to disorient the tail vane so that, upon start-up, the tail vane moves to an orientation substantially aligned with the wind and forces the orbiting blades to their proper position rather than the orbiting blades controlling the orientation of the vane.

Frictional forces caused by the rotation of the blades about their own axles is compensated for by a slight angle of the orienting tail vane which tends to slightly move it from complete alignment with the wind so that the frictional forces are compensated. This bend in the tail vane maintains exact alignment by offsetting the frictional forces with wind force against the bend. This bend has an area greater than one-twentieth the area of the orbiting blades and bent at an angle of between zero and fifteen degrees.

The main shaft drives a speed increaser of a helical-gear type which has less rotating mass against oil in the high-speed end than in the low-speed end. The high-speed end drives a synchronous induction motor, the field of which is excited by the desired frequency so that it may be matched to output power lines.

From the above description, it can be understood that the wind machine of this invention has several advantages, such as: (1) it is rugged and able to withstand high winds; (2) it is unaffected in its speed control by sudden gusts of wind; (3) it is relatively easy to apply a braking action to it for maintenance; (4) it is economical and produces a high amount of power per dollar of capital necessary to manufacture it; and (5) it can be synchronized without a great reduction in power to the frequency of outside power lines.

SUMMARY OF THE DRAWINGS

The above-noted and other features of the invention will be better understood from the following detailed description when considered with reference to the accompanying drawings in which:

FIG. 1 is an elevational view of a wind machine in accordance with an embodiment of the invention;

FIG. 2 is a plan view of the top portion of the embodiment of FIG. 1;

FIG. 3 is an elevational view of a portion of the embodiment of FIG. 1;

FIG. 6 is a simplified elevational view of a portion of the embodiment of FIG. 1.

SPECIFIC DESCRIPTION

Figure 4:
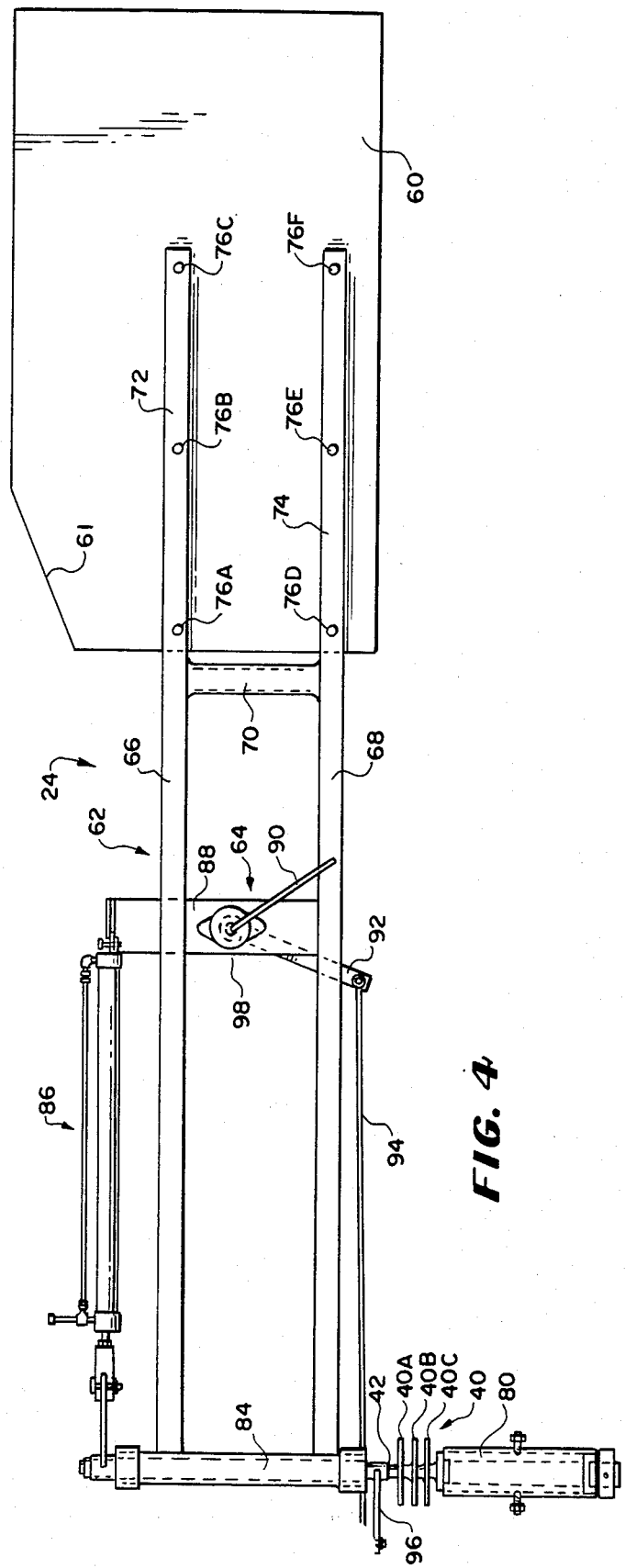
FIG. 4 is an elevational view of a portion of the embodiment of FIG. 1.

In FIG. 1, there is shown a wind machine 10 having a wind-receiving section 12, a tower section 14 and a power-converting section 16. The wind-receiving section 12 is positioned at the top of the tower section 14 in the preferred embodiment for rotation by the wind to provide a primary source of rotational torque which drives the power-converting section 16, which is located at the base of the tower.

The wind-receiving section 12 includes a wind turbine which is capable of being stopped for maintenance by a simple mechanism and which has blade orientation and speed control that compensates for changes in velocity of the wind and for relatively short gusts of wind. The wind receiving section 12 and tower section 14 provide adequate strength in a cost-effective manner, being designed so that the wind machine 10 can support high winds without damage because of its balanced design which includes a point of maximum torque 44 which is strong enough to withstand such winds with a relatively low-cost superstructure designed to match the weakest point.

In the preferred embodiment, power is transmitted through a vertical rotating shaft 15 through a low-friction speed-increasing mechanism to an induction generator or to a mechanical takeoff in the power converting section 16. The induction generator has its frequency controlled by the exciting frequency of a line potential when it is to be applied to the power lines of the interconnected cogenerator to provide high-efficiency power output at a synchronized frequency.

For this purpose, the field of the generator is excited by an AC signal, which is a three-phase signal through conductors in a cable from a terminal box 20, and in return applies three-phase AC potential in phase with the exciting field current. Conductors in the cable 22 communicate with external load and fluid current.

In FIG. 2, there is shown a plan view of the wind-receiving section 12 having a tail-vane assembly 24, a central shaft assembly 26 and three blade assemblies 28A-28C extending radially from the central shaft assembly 26 at angles of one hundred twenty degrees from each other about the central shaft assembly 26. The tail-vane assembly 24 is oriented by the wind and generally maintains that orientation. It in turn controls blades on the blade assemblies to exercise speed control or braking or generate torque of maximum efficiency as the assemblies rotate about the central shaft assembly 26 while maintaining their spacing a hundred twenty degrees from each other.

Each of the blade assemblies includes similar elements and the blade assembly 28A will be described in detail hereinafter, with the other assemblies having similar parts with similar numbers but different letter suffixes.

The blade assembly 28A includes a chain guard 29A and an upper support 30A mounted at one end for rotation about the central shaft assembly 26 and at its other end having a sprocket wheel 32A, a blade axle 34A and a blade 36A. The sprocket wheel 32A engages the endless chain 38A at one end and central sprocket wheel assembly 40 on the central shaft assembly 26A engages the other end of the chain, to be explained hereinafter.

The blade 36A is mounted for rotation about a center pivot 34A which rotates with the sprocket wheel 32A so that the position of the sprocket wheel 32A is controlled by the central sprocket and in turn controls the orientation of the blade 36A. The other blade assemblies have similar parts with similar numbers.

The central shaft assembly 26 includes a central sprocket wheel assembly 40 mounted in a fixed position to the tail-vane assembly 24 for rotation therewith and having three sprocket wheels 40A-40C (FIG. 4) mounted upon it for common rotation, each receiving a corresponding one of the endless chains 38A-38C, so that, as the tail-vane assembly 24 is moved in response to changes in wind direction, such as that indicated at 43, the orientation of the blades 38A-38C is changed.

The orientation of the blades 38A-38C is adjusted in a manner known in the art so that the blades catch the wind at angles in a manner known in the art analogous to the tacking of sails to cause rotation of the assembly about the central shaft. A rotatable bearing 42 is mounted for rotation with the tail vane and a main output shaft 44 is mounted for rotation with the supports 30A-30C.

In the preferred embodiment, the sprocket wheels 40A-40C of the central sprocket wheel assembly 40 each have thirty teeth and the sprocket wheels 32A-32C each have sixty teeth to create a one-to-two ratio, causing the blade 36A to rotate once for every two rotations about the central shaft assembly 26. Moreover, the torque ratios are one-to-two. Thus, the sizes of the tail-vane assembly 24 and the blades 36A-36C taken together with the torque ratios and lever arms of the vane and blades are such that, during start-up, the tail-vane assembly 24 is oriented with the wind and pulls the blade assemblies 28A-28C into position rather than the blade assemblies moving the tail-vane assembly 24 out of position or causing it to rotate.

The ability of the tail vane to position the blade orientation is a function of the force of the wind to rotate the blades 36A-36C about their respective axles 34A-34C and the mechanical advantage between the vane and blades. The mechanical advantage is the ratio of the sprocket wheels and the ratio of the lengths of the location on the blades 36 from the axles 34 in relation to the location of the wind impacting on the vane of the tail-vane assembly 24.

The force of the wind on the tail-vane assembly 24 must be such that that force multiplied by the ratio of the length of the force from the central sprocket wheel assembly 40 divided by the distance of the force on the blades 36A-36C from their respective axles 34A-34C multiplied by the ratio of the teeth on the sprocket wheels 32A-32C divided by the teeth on the central sprocket wheel assembly 40 is greater than the torque tending to rotate the blades 36A-36C. Thus the wind force on the tail-vane assembly 24 causes the blades 36A-36C to be oriented properly. The force created on the vane 60 must be sufficiently great to overcome friction and thus orient the blades even against possible slight momentum caused by rotation of the blades 36A-36C during start-up.

As shown in FIG. 3, the blade assembly 28A and a portion of the central shaft assembly 26 are shown in a simplified fragmentary view. As shown in this view, the blade 36A is mounted for rotation about its axle 34A at the top of its axle to the support 30A and at the bottom of its axle to a bottom support member 46A. The bearing 48A receives the end of the axle 34A and the top of the axle is mounted for rotation in a top bearing. A chain guard 29 is mounted above the top support 30A and the sprocket wheel 32A for driving the top of the axle 34A. The sprocket wheel 32A rotates the blade 36A about the axle as the axle orbits about the central shaft assembly 26.

The blade 36A is broken away at 52A to show an interior polyurethane foam 54A and the axle 34A extending through it. The outer skins of the blades are metallic to hold the polyurethane foam forming a strong, lightweight rigid member which reduces the weight load at the top of the tower section 14 (FIG. 1).

To form a rigid connection between the axle and the blade, metal torque plates are rigidly fastened at spaced-apart locations on the axle 34A such as by welding and extend into the foam 54A to transmit torque from the blade to the axle. They have a combined surface area on the side receiving the wind which is greater than the maximum wind force divided by the compressive strength of the foam in units of pressure. The torque plates are spaced to prevent any distance perpendicular to a plate in the vertical direction between supports a sufficient distance to prevent the forces from exceeding the bending or the shear strength of the combined form and skins of the vanes.

The top and bottom supports 30A and 40A are braced against the central shaft by hollow tubular bracing members 56A and 57A and rotate on a bearing surface to turn within bearings under the control of the tail vane while imparting power to the main shaft from the blades and axles. At point 44, the strength of the tower is sufficient to withstand substantial winds and torque which may be imparted to it by the wind-receiving section 12 (FIG. 1).

In FIG. 4, there is shown an elevational view of the tail-vane assembly 24 and the central sprocket wheel assembly 40. The tail-vane assembly 24 includes a vane 60, a vane support 62 and a brake and speed-control assembly 64. The vane 60 is approximately thirty-six inches in height and four feet long with a tapered corner at 61 and a thickness of approximately one-eighth of an inch. It is made of aluminum for lightness.

The vane support 62 is formed of two steel tubes 66 and 68 supported by a welded steel cross-tube 70. The square tube 66 has a longitudinally extending slot through parallel horizontal sides at its end 72 and the steel tube 68 has a similar slit at its end 74 sized to receive the one-eighth inch aluminum vane 60 therebetween for positioning vertically at the end of the vane support 62.

The vane 60 is bolted at a plurality of locations, such as 76A-76F, through aligned, horizontally oriented holes in the blade and the ends 72 and 74 for mounting the vane 60 to the vane support 62. The inner edge of the vane 60 is approximately five feet from the tail vane axle 84 which is aligned with the central sprocket wheel assembly 40 and its outer end is approximately nine feet from the tail vane axle 84 so that, at its centroid, there is a lever arm of seven feet for purposes of determining the torque on the tail vane axle 84.

The tail vane axle 84 is vertically oriented for rotation within a bearing 80 at its lower end. The three-sprocket central sprocket wheel assembly 40 are mounted for rotation with the tail vane axle 84. The support section 60 has the support tubes 66 and 68 welded to it for rotation therewith and the central sprocket wheel assembly 40 is fastened therewith to receive three chains, each going to a different one of the sprocket wheels 32A-32C (FIG. 2).

With this arrangement, the sum of the forces causing torque about the axles 34A-34C from the vanes 36A-36B in the same rotational direction multiplied by two must be less than seven times the wind force on the vane 60 multiplied by the area of the vane to enable the tail vane assembly 24 to assume its proper position. This position is with the vane 60 aligned with the direction of the wind to control the orientation of the blades 36A-36C rather than the blades imparting torque to the tail vane axle 84 to rotate the tail-vane assembly 24 against the force of the wind.

For proper orientation of the vane 60, the wind force against the vane times the area multiplied by the radius from the center of the sprocket wheels to the centroid of the vane must be larger than the ratio between the number of teeth on the sprocket wheels 32A-32C on the vanes 36A-36C to the sprocket wheels on the assembly 82 multiplied by the forces or torques on the blades 36A-36C.

The brake and speed-control assembly 64 includes a hydraulic cylinder damper 86, a support column 88, an axle 98, a brake lever 90 and a speed-adjustment linkage. The speed-adjustment linkage includes a first lever arm 92, a linkage rod 94 and a second lever arm 96. The support 88 is mounted vertically to the tubular support arms 66 and 68 of the vane support 62. An axle 98 is rotatibly mounted in the support column 88 and controlled by either the brake lever 90 or controlled by certain wind-gust-measuring devices described hereinafter for speed control.

To transfer forces from the axle 98 to the central sprocket wheel asembly 40, the linkage rod 94 is pivoted at one end to the first lever arm 92 to be moved with it and at its other end is pivoted to the second lever arm 96 which turns the central sprocket wheel assembly 40 with respect to the tail vane axle 84 and the bearing 80 to move the chains 38A-38C (FIG. 2) and thus turn the sprocket wheels 32A-32C and the blades 36A-36C (FIG. 2).

Figure 5:
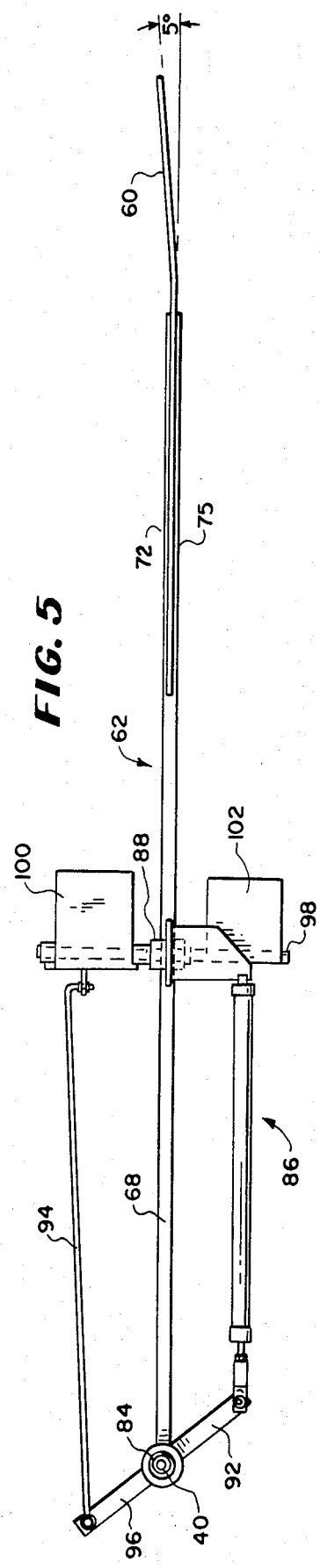
FIG. 5 is a plan view of the portion of FIG. 4.

In FIG. 5, there is shown a plan view of the tail-vane assembly 24 illustrating some aspects of the vane 60 and of the speed-control assembly 64.

The vane 60 extends radially along a straight line through the center of the tail vane axle 84 except for a portion which is at an angle sufficient to compensate for frictional forces generated by the blades 36A-36C. The angle receives wind that tends to rotate the tail vane in a direction opposite to the direction of the blades. In the preferred embodiment the angle is such as to tend to rotate the tail vane clockwise (FIG. 5) and orbiting of the blades is counterclockwise since this causes a clockwise rotation of the blades against counterclockwise frictional forces.

In the preferred embodiment, the portion of the vane 60 which is curved must be at least equal to twenty-five percent of the surface area of one of the blades 30A-30C and must be at an angle of between one degree and fifteen degrees from a direct radial direction from the axle 98. Generally, the sum of the torques caused by friction as the blades rotate, multiplied by the transmission ratio should be substantially equal to the wind pressure multiplied by each area of corresponding curved portions of the vane multiplied by the tangent of the angle of curvature. In the preferred embodiment, there is only one curved area at an angle of five degrees and the transmission ratio is the distance of the centroid of the curved portion from the support column 88 divided by two.

The wind-control assembly includes first and second wind-measuring vanes 100 and 102, each mounted for rotation with the axle 98 and having their wide surfaces extending radially therefrom to catch wind which is blowing in a direction aligned with the support arm 68 and the vane 60. The wind-measuring vanes 100 and 102 are substantially rectangular and have a sufficient area to pivot the axle 98 in proportion to wind velocities of between zero miles per hour and one hundred fifty miles per hour, being lifted from a vertical position at zero miles per hour to a substantially horizontal position completely aligned with the wind at one hundred fifty miles per hour.

The lever arms 96 and 92 are aligned with each other for rotation about the support column 88, with one end of the second lever arm 96 being connected to one side of the wind-measuring vane 100 through the linkage rod 94 and the end of the second lever arm 96 being connected through the hydraulic cyclinder damper 86 to the other end of the wind-measuring vane 102, so that, as the wind-measuring vanes 100 and 102 move from a vertical position to a substantially horizontal position, the lever arms 96 and 92 are rotated in a horizontal plane in a counterclockwise direction.

As the lever arms 92 and 96 move, the central sprocket wheel assembly 40 is correspondingly rotated to shift the angles of the blades 36A–36C. As the first lever arm 92 is moved by increased wind, it compresses the hydraulic cylinder damper 86, forcing the recirculation of oil through a restricted path so as to slow down the motion. The restricted oil path is such as to prevent angular shifting of the blades by gusts of wind at a rate of more than nine degrees for each minute so that gusts of wind do not materially affect rotation of the blades unless the gust exceeds four minutes in duration.

In the preferred embodiment, the blades are rotated through one degree of rotation for each two degrees of the central sprocket wheel assembly 40 and a forty-five degree rotation from optimum will balance the torque from wind to substantially stop the turbine. With this arrangement, gusts of wind of short duration do not cause a shifting of the angle of the blades 36A–36C but only steady changes in the velocity of the wind cause the angles to be displaced to reduce the force of the wind upon them and protect the stability of the windmill.

In FIG. 6, there is shown a simplified drawing of the power-conversion section 16 having an induction generator 110, a gear coupling 112, a speed-increasing transmission 114 and a second coupling unit 116. The gear coupling is able to take both acceleration and deceleration because it does not include a nonmetallic membrane which flexes during changes in speed.

The induction generator 110, the couplings 112 and 116 and the speed-increasing transmission 114 are housed within a substantially parallelopiped-shaped housing 118 to protect it from the elements. In the preferred embodiment, the field windings apply a synchronizing frequency from a source, including a frequency synchronized with the main power lines, and the output conductors provide an AC frequency synchronized with the field windings.

The generator 110 is a synchronous induction generator having a capacity to handle load related to the area of the blades 36A–36C, the speed of which is controlled by a transmission unit which increases the speed for efficiency. This type of transmission must be a transmission, such as a helical-gear transmission, which does not have a high mass of moving parts on the output end but has, such as in the case of a gear transmission, relatively few parts on the high-speed end so as to create less oil friction at high speed.

In the preferred embodiment, the coupling unit 116 is a gear coupling, the transmission 114 is a helical gear in-line speed increaser with taperroller bearings and a ratio of 40 to 1, the coupling 112 is a conventional gear coupling and the induction generator 110 is a three-phase generator with 460/220 volts designed to operate at 1,200 revolutions per minute.

In operation, when the turbine is beginning to rotate after it has been braked or after a period of low wind, the tail-vane assembly 24 has an orientation to which it has been pulled by the inertial rotation of the blade assemblies 28A–28C when the wind stopped.

When the wind starts again, the tail-vane blade 60, because of its larger surface area and the radius of its lever arm, has a greater force applied to it than the rotational forces of the blades 36A–36C and so aligns itself with the wind, pulling the blades 36A–36C with it into a position in which they each receive wind in a direction that provides a torque component for rotation of the shaft of the windmill. Because the end of the vane 60 is bent against the direction of the frictional forces of the blades, the blades are held in a correct orientation about their shafts without being moved out of position by the friction of the rotation blades so as to align the blades 36A–36C properly at moderate wind speeds.

The wind machine 10 automatically controls its overspeed speed to prevent damage in high winds. To accomplish the speed adjustment, the wind-measuring vanes 100 and 102 have their wide sides perpendicular to the longitudinal axes of the vane 60 to be impacted directly by the full force of the wind.

The wind pivots the wind-measuring vanes and thus pivots a lever mechanism which turns the central sprocket wheel assembly 40 to control the orientation of the blades 36A–36C. The wind-measuring vanes pivot upwardly as the wind velocity increases and, since the force of the wind is equal to the velocity squared, the pivoting force increases nonlinearly with wind velocity. As the feathering blades pivot upwardly, the area facing the wind decreases and the length of the lever arm to the areas of force of the wind decreases, resulting in a nonlinear reduction in force until equilibrium is reached.

The speed of the turbine is thus controlled to reduce its tendency to exceed a preset maximum speed by the area and weight of the wind-measuring vanes. It operates effectively with wind turbines designed to operate at low speed as well as at high speeds and is economical in construction. To prevent a reaction from sudden gusts of wind, the levers which are controlled by the speed-control vanes are buffered with a hydraulic buffer having a relatively long time-constant so that a relatively steady wind is required before the angular orientations of the blades 36A–36C about their axles are adjusted.

The blades 36A–36C catch the wind and rotate the vertical shaft of the windmill which is coupled to a speed increaser. The speed increaser is of a type which has less mass at the high-speed end than the low-speed end. This is a characteristic of straight-gear speed increasers. The speed increaser is connected to an induction generator, the field of which may be controlled by an external source for synchronizing the frequency.

Although the preferred embodiment has a vertically oriented shaft with blades which orbit about the shaft while rotating to adjust their angular orientation with respect to the wind, it is obvious that the wind machine may have a horizontally positioned shaft with blades that orbit about the horizontal shaft. In such a configuration, the tail vane orients the blades by causing the entire blade assembly to rotate about a vertical axis so as to face into the wind in a manner known in the art. The adjustment of the blades may be substantially the same and the same speed adjustment and motor connections may be used.

From the above description, it can be seen that the wind machine of this invention has several advantages, such as: (1) it provides a relatively high power output per dollar cost of machine; (2) it is adjustable in speed; (3) it readily accommodates adjustment of the generator directly to power lines without an intermediate DC-AC conversion; (4) it has a convenient braking mechanism; (5) its speed is regulated by wind speed impacting on vanes rather than by an inertial governor or the like; and (6) it is relatively strong per dollar cost because of the foam-insulated structure of the blades.

Although a preferred embodiment of the invention has been described with some particularity, many modifications and variations of the preferred embodiment are possible in the light of the above teachings. Therefore, it is to be understood that, within the scope of the appended claims, the invention may be practiced other than as specifically described.

What is claimed is:

1. A wind-driven machine comprising:
    a support tower having a rotating output shaft;
    a plurality of wind-driven blades mounted for orbiting about said rotating output shaft to impart torque thereto;
    each of said wind-driven blades having a blade axle about which it rotates;
    means for adjusting the angle of said wind-driven blades with respect to their axles as said wind changes in velocity, whereby the speed of rotation of said rotating output shaft is controlled;
    said means for adjusting the angle comprising control-vane means adapted to rotate about a control-vane-means axle so as to be substantially aligned with the direction of the wind;
    a sprocket-and-chain assembly connecting said control-vane means to said wind-driven blade axles to adjust said wind-driven blade axles in position as said wind-driven blades orbit about said output shaft;
    said means for adjusting including wind-responsive means adjusted to shift said sprocket-and-chain assembly in orientation about said control-vane-axle means, whereby the orientation of said wind-driven blades with respect to their axles is shifted as they orbit about said rotating output shaft;
    brake-lever means for shifting the orientation of said sprocket-and-chain assembly by ninety degrees, whereby said blades are disoriented and orbiting is terminated;
    said control-vane means having an angled portion of sufficient size to compensate for the friction of rotation about the axles of the wind-driven blades;
    wind-gust-buffering means connected to said wind-responsive means for preventing shifting of said sprocket-and-chain assembly of ninety degrees by gusts of wind less than four minutes in duration;
    said rotating output shaft being adapted to be connected to a speed increaser;
    said speed increaser having a low-speed end and a high-speed end;
    said high-speed end having less surface-contact area with moving oil than said low-speed end;
    a synchronous generator;
    means connecting said speed increaser to said synchronous generator;
    said synchronous generator having a field winding;
    said field winding being adapted to be connected to a source of exciting frequency of sixty cycles per second, and
    output means for said synchronous for supplying power at the frequency of said exciting-frequency source.

2. A wind-driven machine according to claim 1 in which said wind-driven blades have:
    a metallic outer shell and a plastic foam interior;
    each of said blade axles passing through said foam;
    each of said blade axles having a plurality of support means fastened to it in said foam;
    said support means having a combined surface area on the side of the blade receiving the wind which is greater than the maximum wind force divided by the compressive strength of the foam in units of pressure; and
    said support means being spaced from each other such that the distance between them in the direction of the blade axle multiplied by the equivalent force of the wind at that distance, does not exceed the bending or the shear strength of the combined foam and blade skins.

3. A wind-driven machine according to claim 2 in which the surface area of said control vane multiplied by its distance from its shaft and by the ratio of the drive sprocket from said control vane to the sprockets of said orbiting wind-driven blades is equal to at least 20 percent of the surface area of said wind-driven blades.

4. A wind-driven machine according to claim 3 in which the maximum power output of said synchronous generator is directly proportional to the area of said rotating blades and the maximum usable wind velocity cubed.

5. A wind-driven machine comprising:
    support means having a rotating output shaft;
    a plurality of wind-driven blades mounted for orbiting about an orbit center point to impart torque thereto;
    each of said wind-driven blades having a blade axle about which it rotates a metallic skin and foam plastic interior;
    means for adjusting the angle of each of said wind-driven blades with respect to its axle as the blade orbits;
    each of said blade axles passing through said foam;
    each of said blade axles having a plurality of support means fastened to it in said foam;
    said support means having a combined surface area on the side of the blade receiving the wind which is greater than the maximum wind force divided by the compressive strength of the foam in units of pressure; and
    said support means being spaced from each other such that the distance between them in the direction of the blade axle multiplied by the equivalent force of the wind at that distance, does not exceed the bending or the shear strength of the combined foam and blade skins.

* * * * *